(12) United States Patent
Mitsuoka et al.

(10) Patent No.: US 9,994,123 B2
(45) Date of Patent: Jun. 12, 2018

(54) CONTROLLING APPARATUS FOR VEHICLE

(71) Applicant: MITSUBISHI JIDOSHA KOGYO KABUSHIKI KAISHA, Tokyo (JP)

(72) Inventors: Hidetaka Mitsuoka, Tokyo (JP); Toshikatsu Suzuki, Tokyo (JP); Masahiro Murase, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/445,580

(22) Filed: Feb. 28, 2017

(65) Prior Publication Data

US 2017/0267122 A1    Sep. 21, 2017

(30) Foreign Application Priority Data

Mar. 16, 2016  (JP) ................. 2016-052571

(51) Int. Cl.
*B60L 15/20* (2006.01)
*B60W 50/00* (2006.01)
(Continued)

(52) U.S. Cl.
CPC ........... *B60L 15/2045* (2013.01); *B60L 7/16* (2013.01); *B60L 7/18* (2013.01); *B60L 15/209* (2013.01);
(Continued)

(58) Field of Classification Search
CPC ...... B60L 15/10; B60L 15/20; B60L 15/2045; B60L 15/2054; B60L 15/209;
(Continued)

(56) References Cited

U.S. PATENT DOCUMENTS 8,744,712 B2   6/2014  Tashiro et al.
9,694,711 B2   7/2017  Mitsuoka
(Continued)

FOREIGN PATENT DOCUMENTS

| EP | 2 409 871 A2 | 1/2012 |
| EP | 3 118 078 A1 | 1/2017 |
| JP | 2006-42416 A | 2/2006 |
| JP | 2006042416 A * | 2/2006 |
| JP | 2014-79087 A | 5/2014 |

OTHER PUBLICATIONS

Extended European Search Report dated Sep. 25, 2017 for counterpart European Patent Application No. 17161165.0.

*Primary Examiner* — Thomas G Black
*Assistant Examiner* — Sara J Lewandroski
(74) *Attorney, Agent, or Firm* — Birch, Stewart, Kolasch & Birch, LLP

(57) ABSTRACT

A controlling apparatus is provided for a vehicle including a motor, an inverter, and a battery. The controlling apparatus includes a determiner, an estimator, and a controller. The determiner judges whether a first condition is satisfied or not. The first condition is satisfied if the vehicle is in a coasting state in a regeneration prohibited mode in which a regenerative brake is disabled. The estimator estimates whether a second condition is satisfied or not. The second condition is satisfied if the motor is not to generate a regenerative torque upon a shutdown of the inverter. The controller shuts down the inverter if the determiner judges that the first condition is satisfied and the estimator estimates that the second condition is satisfied.

18 Claims, 2 Drawing Sheets

(51) Int. Cl.
   *B60L 7/16* (2006.01)
   *B60L 7/18* (2006.01)
   *B60W 30/18* (2012.01)
(52) U.S. Cl.
   CPC .. *B60W 30/18072* (2013.01); *B60W 50/0097* (2013.01); *B60L 2240/12* (2013.01); *B60L 2260/24* (2013.01); *B60W 2520/10* (2013.01); *Y02T 10/645* (2013.01); *Y02T 10/72* (2013.01); *Y02T 10/7283* (2013.01)
(58) Field of Classification Search
   CPC .......... B60L 15/22; B60L 15/36; B60L 15/38; B60L 2260/24; B60L 2210/42; B60L 3/0023; B60L 3/003; B60L 7/10; B60L 7/14; B60L 7/16; B60L 7/18; B60W 30/18072; B60W 30/18127; B60W 2030/18081; B60W 2030/1809; Y02T 10/72; Y02T 10/7283
   See application file for complete search history.

(56) References Cited

U.S. PATENT DOCUMENTS

| | | | |
|---|---|---|---|
| 2010/0063661 A1* | 3/2010 | Saito | B60K 6/445 |
| | | | 701/22 |
| 2011/0029179 A1* | 2/2011 | Miyazaki | B60K 6/46 |
| | | | 701/22 |
| 2012/0022735 A1 | 1/2012 | Tashiro et al. | |
| 2014/0067225 A1 | 3/2014 | Lee et al. | |
| 2014/0152093 A1* | 6/2014 | Wald | B60L 3/0046 |
| | | | 307/10.1 |
| 2015/0274029 A1* | 10/2015 | Tanaka | B60L 7/18 |
| | | | 701/22 |
| 2016/0375774 A1* | 12/2016 | Lauter | B60L 3/0076 |
| | | | 318/400.22 |
| 2017/0015212 A1* | 1/2017 | Mitsuoka | B60W 50/0097 |
| 2017/0320497 A1* | 11/2017 | Khafagy | F16H 61/143 |

* cited by examiner

CONTROLLING APPARATUS FOR VEHICLE

CROSS-REFERENCE TO THE RELATED APPLICATION

This application incorporates by references the subject matter of Application No. 2016-052571 filed in Japan on Mar. 16, 2016 on which a priority claim is based under 35 U.S.C. § 119(a).

FIELD

The present invention relates to a controlling apparatus for a vehicle, the apparatus being configured to shut down an inverter in a coasting state of the vehicle.

BACKGROUND

Electric-powered vehicles (electric vehicles and hybrid vehicles) each including a motor provided for traveling have a typical purpose of enhancing electrical power efficiency (traveling distance per unit electric power consumption) with the aim of enlarging a cruising range. One of the known methods for enhancing electrical power efficiency is to prohibit application of regenerative brake while the vehicle is coasting. This method suppresses deceleration of the coasting vehicle, resulting in elongating the coastable distance and thus, the electrical power efficiency can be enhanced.

Another known method for enhancing the electrical power efficiency is to reduce the amount of electric power consumed by an inverter provided for driving the motor. For example, there is a known method which shuts down the inverter when the vehicle is not moving due to traffic lights, thereby suppressing the electric power consumption. In addition, there is a proposed method which shuts down the inverter when the vehicle is directed to coast (freewheel) while traveling, and there is another proposed method which stops (shuts down) the electric supply for the inverter to cause the vehicle to coast if the velocity of the vehicle varies within a predetermined range for a predetermined period (see Japanese Patent Laid-Open Nos. 2006-42416 and 2014-79087). According to these methods, since the amount of electric power consumed by the inverter can be suppressed, the electrical power efficiency can be enhanced.

SUMMARY

Technical Problems

When prohibiting the application of the regenerative brake as described above, a controller outputs signals to control the inverter and thereby, the motor is controlled so as not to produce regenerative torque. Because of this, if the inverter is shut down while the application of the regenerative brake is prohibited for enhancing the electrical power efficiency in a coasting vehicle, the motor becomes out of control so that the regenerative torque may be produced. If the regenerative torque is generated despite of prohibiting the application of the regenerative brake, the vehicle decelerates contrary to driver's intention and thus, the drivability of the vehicle cannot be ensured. On the other hand, in terms of enhancing the electrical power efficiency, shutting down the inverter is preferred when the vehicle is in the coasting state.

With the foregoing problems in view, an object of the present disclosure is to provide a controlling apparatus for controlling a vehicle that is able to achieve both enhanced electrical power efficiency and ensured drivability. Another object of the present disclosure is to achieve advantageous effects that cannot be achieved through the traditional art by employing the configurations described below in the embodiments.

Solutions to Problems (1) The controlling apparatus disclosed herein is provided for a vehicle including a motor for traveling, an inverter for driving the motor, and a battery being connected to the motor via the inverter and being rechargeable and dischargeable, the controlling apparatus including: a determiner that judges whether a first condition is satisfied or not, the first condition being satisfied if the vehicle is in a coasting state in a regeneration prohibited mode in which a regenerative brake is disabled; an estimator that estimates whether a second condition is satisfied or not, the second condition being satisfied if the motor is not to generate a regenerative torque upon a shutdown of the inverter; and a controller that shuts down the inverter if the determiner judges that the first condition is satisfied and the estimator estimates that the second condition is satisfied.

(2) The controlling apparatus may further include a first obtainer that acquires a first parameter correlating with a number of revolutions of the motor. In this case, the estimator may estimate that the second condition is satisfied when the first parameter acquired by the first obtainer is less than a predetermined first threshold value. (3) The controlling apparatus may further include a second obtainer that acquires a second parameter correlating with a voltage of the battery. In this case, the estimator may estimate that the second condition is satisfied when the first parameter acquired by the first obtainer is equal to or greater than the first threshold value and less than a predetermined second threshold value being greater than the first threshold value while the second parameter acquired by the second obtainer is greater than a predetermined third threshold value.

(4) The third threshold may be set to increase with the first parameter.

(5) The estimator may estimate whether the second condition is satisfied or not by referring to a map representing a relationship between the first parameter and the second parameter.

(6) The first parameter may be the number of revolutions of the motor.

(7) The estimator may estimate that the second condition is satisfied when a voltage applied to the motor is lower than a voltage of the battery.

Advantageous Effects

According to the disclosed controlling apparatus for a vehicle, the inverter is shut down if it is judged that the vehicle is in the coasting state in the regeneration prohibited mode and concurrently estimated that the motor is not to generate a regenerative torque upon a shutdown of the inverter. As a consequence, it is possible to achieve both enhanced electrical power efficiency and ensured drivability of the vehicle.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

The controlling apparatus for a vehicle according to embodiments will now be described with reference to the accompanying drawings. The following embodiment is merely illustrative and not construed to exclude any other modification or application not illustrated in the following description.

1. Configuration of Apparatus

Figure 1:
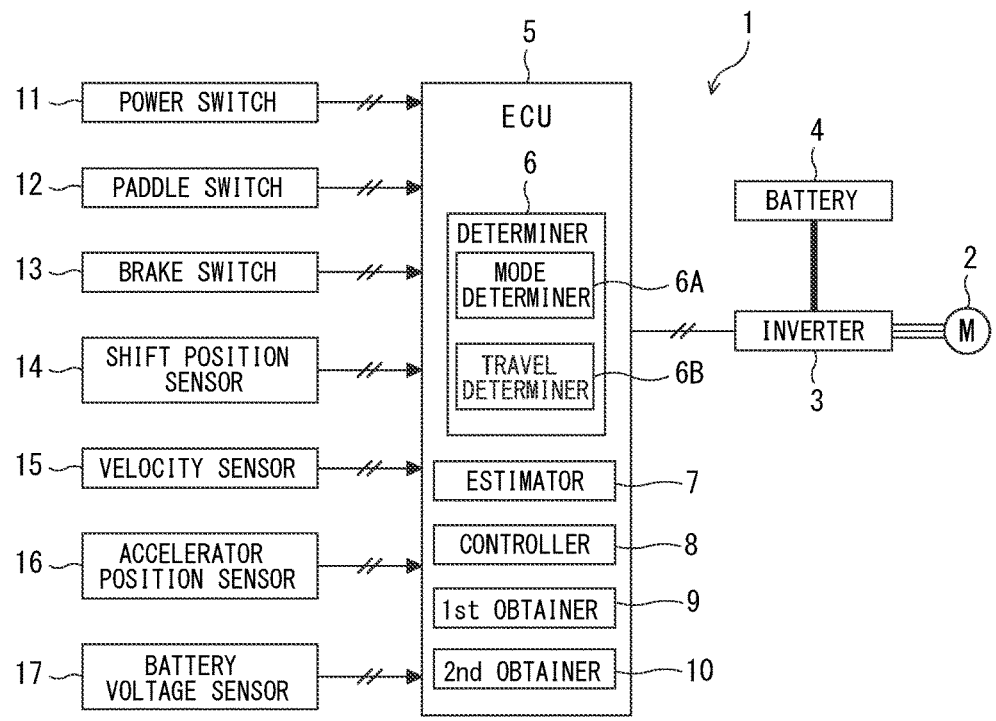
FIG. 1 is a block diagram illustrating a configuration of the controlling apparatus according to an embodiment.

The controlling apparatus 5 (hereinafter, referred to as ECU 5) according to the present embodiment is an electronic control unit installed in a vehicle 1 illustrated in FIG. 1. The vehicle 1 is an electric-powered vehicle (an electric vehicle or a hybrid vehicle) and includes a motor 2 provided for traveling, an inverter 3 provided for driving the motor 2, and a rechargeable and dischargeable battery(ies) 4 connected to the motor 2 via the inverter 3.

The battery 4 is, for example, a secondary battery (such as a lithium-ion battery and nickel-hydrogen battery) formed by accommodating multiple battery modules in a battery case (neither of which is illustrated). The battery 4 is configured to be capable of supplying the motor 2 with electric power for driving the vehicle 1 and also of storing electric power regenerated by the motor 2.

The motor 2 is a motor-generator which functions as both a motor and a generator. The motor 2 is electrically connected to the battery 4 via the inverter 3. The motor 2 is controlled by the ECU 5 via the inverter 3. In other words, the ECU 5 controls the motor 2 by controlling the inverter 3. Through this control, the ECU 5 obtains information on a number Nm of revolutions of the motor 2 (hereinafter, the number Nm is referred to as motor speed Nm). The rotating shaft of the motor 2 is mechanically connected to driving wheels (not illustrated) of the vehicle 1. The motor 2 drives the driving wheels by consuming the electric power stored in the battery 4 when functioning as a motor. On the other hand, the motor 2 applies a regenerative brake on the driving wheels and also charges the battery 4 by regenerating electric power from the rotation of the driving wheels when functioning as a generator.

The inverter 3 is an electric-power-converter having an electrical circuit(s) for converting DC power to AC power and vice versa by consuming the electric power stored in the battery 4. When the motor 2 functions as a motor, the inverter 3 converts the DC power in the battery 4 to AC power and supplies the AC electric power to the motor 2. In contrast, when the motor 2 functions as a generator, the inverter 3 converts the AC power generated by the motor 2 to DC power and stores the DC electric power into the battery 4.

The inverter 3 establishes an electrical connection between the motor 2 and the battery 4 when the electrical circuit in the inverter 3 is connected, and shuts down the exchange of the electric power between the motor 2 and the battery 4 when the electrical circuit in the inverter 3 is disconnected. In the following description, connecting the electrical circuit in the inverter 3 is also called "connecting the inverter 3" and shutting down the electrical circuit in the inverter 3 is also called "shutting down the inverter 3." The operation state and the connection state of the inverter 3 are controlled by an ECU 5.

The ECU (Electronic Control Unit) 5 includes, for example, LSI (Large Scale Integration) devices or built-in electronic devices, into which known microprocessors, ROM (Read Only Memory), RAM (Random Access Memory), and the like are integrated. The ECU 5 is connected to a communication line of a network provided in the vehicle 1. The ECU 5 of this embodiment includes a first obtainer 9 that acquires information on the motor speed Nm and a second obtainer 10 that acquires information on a voltage Vb of the battery 4 (hereinafter, the voltage Vb is referred to as battery voltage Vb). The ECU 5 controls various matters including the connection (connecting and shutting down) of the electrical circuit of the inverter 3. The ECU 5 is connected to the inverter 3 and also to a power switch 11, a paddle switch 12, a brake switch 13, a shift position sensor 14, a velocity sensor 15, an accelerator position sensor 16, and a battery voltage sensor 17.

The power switch 11 is an operable switch for a driver to turn on and off a main power of the vehicle 1 and is provided near the driving seat in the interior of the vehicle 1. The operation of the power switch 11 changes the state of the main power to one of an ON state, a READY state, and an OFF state. Each of the ON state and the READY state represents a state in which the main power is on. In contrast, the OFF state represents a state in which the main power is off. In the ON state, only limited on-board devices (such as an audio system and a navigation system) are operable and the vehicle 1 is unable to run (i.e., the motor 2 is inoperable). In the READY state, on the other hand, all of the on-board devices are operable and the vehicle 1 is able to run (i.e., the motor 2 is operable). The power switch 11 transmits the state of the main power to the ECU 5.

The paddle switch 12 is an operable switch for the driver to select the magnitude of a regenerative brake force to be applied to the vehicle 1 and is provided, for example, on both sides of a steering wheel. In the vehicle 1 of the present embodiment, the magnitude of the regenerative brake force is changeable (settable) to multiple (for example, six) levels ranging from zero to a maximum value. For instance, if the magnitude of the regenerative brake force is set at zero, the motor 2 does not regenerate the electric power even when the accelerator is off (not pressed), not causing the regenerative brake to be applied to the vehicle 1. In contrast, if the magnitude of the regenerative brake force is set at a value greater than zero, the motor 2 regenerates the electric power when the accelerator is off, causing the regenerative brake to be applied to the vehicle 1, thereby causing the vehicle 1 to decelerate.

The paddle switch 12 of the present embodiment includes a first switch operable for lowering the magnitude of the regenerative brake force (in other words, for shifting the regenerative brake force in a reducing direction) and a second switch operable for elevating the magnitude of the regenerative brake force (in other words, for shifting the regenerative brake force in an increasing direction). The regenerative brake force is set in accordance with the operation on the paddle switch 12 by the driver. The paddle switch 12 transmits the set information to the ECU 5.

The brake switch 13 detects a pressed amount of a brake pedal which is operable by the driver, or whether the driver applies the brake or not and transmits the detected information to the ECU 5. The brake switch 13 according to the present embodiment outputs an ON signal when the brake pedal is pressed (when the brake is applied) and outputs an OFF signal (or stops outputting the ON signal) when the brake pedal is not pressed (when the brake is not applied).

The shift position sensor 14 detects the position (shift position) of the shifter which is operable by the driver. Specifically, the shift position sensor 14 detects the positions such as a parking (P) position, a neutral (N) position, and a drive (D) position. The drive position may be a D range, an E (ECO) range, or a B (BRAKE) range. The shift position sensor 14 transmits the detected information to the ECU 5.

The velocity sensor 15 detects a velocity V of the vehicle 1 and transmits the detected information to the ECU 5.

The accelerator position sensor 16 detects a pressed amount of an accelerator pedal which is operable by the driver (hereinafter, the pressed amount of the accelerator pedal is referred to as an accelerator position) and transmits the detected information to the ECU 5.

The battery voltage sensor 17 is a detector that observes the battery voltage Vb and is provided to a position (for example, inside the battery 4 or in an electrical circuit connected to the battery 4) suitable for detecting the battery voltage Vb. The battery voltage sensor 17 transmits information on the acquired battery voltage Vb to the second obtainer 10 in the ECU 5.

2. Configuration of Control

The ECU 5 according to the present embodiment performs a shutdown control in accordance with the information input from the inverter 3, the various switches 11-13, and the various sensors 14-17. In the shutdown control, the electrical circuit of the inverter 3 is disconnected to shut down the exchange of the electric power between the motor 2 and the battery 4. The present embodiment assumes that the shutdown control is performed on the inverter 3 if at least one of the following conditions (1) to (3) is satisfied.

<Conditions for Performing Shutdown Control>
(1) The vehicle 1 is not moving (the velocity V equals 0).
(2) The position of the shifter is other than the drive position (the P or N position).
(3) The vehicle 1 is in a coasting state in a regeneration prohibited mode and regenerative torque is expected to be zero upon a shutdown of the inverter 3.

In the above (1) and (2), the motor 2 does not function as a motor or a generator. Because of this, in these occasions, shutting down the inverter 3 can reduce the electric power to be consumed by the inverter 3.

The ECU 5 of the present embodiment is characterized by the feature that shuts down the inverter 3 also in the above occasion (3). This feature will now be detailed. It is to be noted that the regeneration prohibited mode is a drive mode in which the regeneration of the electric power is prohibited such that the electric power is not regenerated during the coast even if the accelerator is off. In other words, if the vehicle 1 is in the regeneration prohibited mode, the generative brake is not applied to the vehicle 1. The vehicle 1 is in the regeneration prohibited mode when the magnitude of the regenerative brake force is set at zero and the shifter is at the drive position while the main power is in the READY state. The coasting state means a state in which the vehicle 1 is coasting (traveling by inertial force). In other words, the coasting state is a circumstance where the velocity is not zero and neither the accelerator nor the brake is operated.

When the vehicle 1 is in the coasting state with the accelerator being stepped off, the motor 2 does not need to function as a motor. However, when the vehicle 1 is in the coasting state in a drive mode that regenerates electric power, since the motor 2 needs to function as a generator, the motor 2 needs to be controlled, thus, the inverter 3 needs to be connected. Further, when the vehicle 1 is in the coasting state in the regeneration prohibited mode, the motor 2 does not need to function as a generator, but may function as a generator spontaneously, depending on the states of the motor 2 and the battery 4. In order to prevent this, the motor 2 needs to be controlled, thus, the inverter 3 needs to be connected.

The motor 2 spontaneously functions as a generator, as described above, in occasions where an induced voltage, which is generated in the motor 2 due to the rotation of the motor 2, is higher than the battery voltage Vb. In such occasions, the electricity flows from the motor 2 to the battery 4 as in cases where electric power is regenerated, so that regenerative torque is produced and as a consequence, the regenerative brake force is applied to the vehicle 1. As such, in occasions where the motor 2 spontaneously functions as a generator during the coast in the regeneration prohibited mode, the coastable distance does not increase and moreover, the vehicle 1 decelerates contrary to the driver's intention, so that the drivability is not ensured. To prevent these, the conventional techniques have kept the inverter 3 connected during the coast in the regeneration prohibited mode to control the motor 2 such that the regenerative torque becomes zero or substantially zero (i.e., the regenerative brake force is not applied to the vehicle 1).

However, the motor 2 does not always function as a generator spontaneously during the coast in the regeneration prohibited mode. When the motor 2 does not spontaneously function as a generator during the coast in the regeneration prohibited mode, the regenerative torque becomes zero or substantially zero without the control of the motor 2, so that even if the inverter 3 is shut down (disconnected), there is no risk of making the driver feel the deceleration.

In view of this, the ECU 5 according to the present embodiment performs the shutdown control if the motor 2 is not expected to spontaneously function as a generator upon a shutdown of the inverter 3 while the vehicle 1 is in the coasting state in the regeneration prohibited mode. Thereby, the ECU 5 enhances the electrical power efficiency. In contrast, the ECU 5 according to the present embodiment keeps the inverter 3 connected if the motor 2 is expected to spontaneously function as a generator upon a shutdown of the inverter 3 while the vehicle 1 is in the coasting state in the regeneration prohibited mode. Thereby, the ECU 5 ensures the drivability of the vehicle 1.

Accordingly, the ECU 5 of this embodiment does not perform the shutdown control in every coasting state in the regeneration prohibited mode, but performs the shutdown control if the ECU 5 estimates that "the motor 2 is not to generate regenerative torque upon a shutdown of the inverter 3". Thereby, the ECU 5 achieves both enhanced electrical power efficiency and ensured drivability.

The ECU 5 includes a determiner 6, an estimator 7, and a controller 8, each of which is a functional element for performing the above shutdown control. Each of these elements may be implemented by electronic circuitry (hardware) or may be programmed as software. Alternatively, some of the functions may be provided as hardware while the remaining functions may be implemented by software.

The determiner 6 judges whether a first condition described below is satisfied or not. The estimator 7 estimates or determines whether a second condition described below is satisfied or not.

<First Condition>

The vehicle 1 is in the coasting state in the regeneration prohibited mode.

<Second Condition>

The motor 2 is not to generate regenerative torque upon a shutdown of the inverter 3.

The determiner 6 of the present embodiment judges that the first condition is satisfied if both a mode condition and a travel condition described below are satisfied. Otherwise (i.e., if at least one of the mode condition and the travel condition is unsatisfied), the determiner 6 of the present embodiment judges that the first condition is not satisfied.

<Mode Condition>

The drive mode of the vehicle 1 is the regeneration prohibited mode.

<Travel Condition>

The vehicle 1 is in the coasting state.

The determiner 6 has a mode determiner 6A that determines whether the mode condition is satisfied or not and a travel determiner 6B that determines whether the travel condition is satisfied or not. In the present embodiment, if the mode determiner 6A decides that the mode condition is satisfied, the estimator 7 estimates whether the second condition is satisfied, and if the estimator 7 estimates that the second condition is satisfied, the travel determiner 6B decides whether the travel condition is satisfied.

Alternatively, the estimator 7 may estimate whether the second condition is satisfied or not if the mode determiner 6A and the travel determiner 6B respectively decide the satisfactions of the mode condition and the travel condition. Moreover, the decisions by the mode and travel determiners 6A, 6B and the estimation by the estimator 7 may be performed concurrently (in parallel with one another). That is, as far as the determiner 6 and the estimator 7 can together judge or estimate whether both the first and the second conditions are satisfied or not, the orders of the decisions and the estimation are not particularly limited.

The mode determiner 6A decides whether the mode condition is satisfied or not on the basis of the information transmitted from the power switch 11, the paddle switch 12, and the shift position sensor 14. Specifically, the mode determiner 6A decides that the mode condition is satisfied if the magnitude of the regenerative brake force is set at zero and the shifter is at the drive position while the vehicle 1 is in the READY state. The mode determiner 6A decides the satisfaction or dissatisfaction of the mode condition in a predetermined calculation cycle.

The travel determiner 6B decides whether the vehicle 1 is in the coasting state or not on the basis of the information transmitted from the brake switch 13, the velocity sensor 15, and the accelerator position sensor 16. The travel determiner 6B of the present embodiment decides that the vehicle 1 is in the coasting state if the velocity V is not zero and neither the accelerator nor the brake is operated (i.e., the driver does not demand acceleration or deceleration) while a torque value of the motor 2 calculated from, for example, the accelerator position or the pressed amount of the brake equals to zero or substantially zero.

The travel determiner 6B calculates the torque value of the motor 2, as mentioned above, to consider the response delay in the motor 2 when judging the satisfaction or dissatisfaction of the travel condition. The torque value of the motor 2 does not become zero or substantially zero at the moment the accelerator or the brake is off, but it gradually falls toward zero after the accelerator or the brake is off. In view of this, the travel determiner 6B refers to the calculated torque value of the motor 2 in addition to the operational states of the accelerator and the brake, thereby increasing the accuracy of the decisions on whether the vehicle 1 is in the coasting state or not.

The estimator 7 estimates whether the second condition is satisfied or not on the basis of current states of the motor 2 and the battery 4. The estimator 7 of the present embodiment estimates whether the second condition is satisfied on the basis of the relationship between the motor speed Nm (first parameter) acquired by the first obtainer 9 and the battery voltage Vb (second parameter) acquired by the second obtainer 10. The estimator 7 forms this estimate by referring to an exemplified map illustrated in FIG. 2. This map is stored in a memory (such as ROM and RAM) in the ECU 5, for example.

Specifically, the estimator 7 estimates that the second condition is satisfied if at least one of conditions (A) and (B) described below is satisfied. In contrast, the estimator 7 estimates that the second condition is unsatisfied if neither condition (A) nor (B) is satisfied. Accordingly, each of conditions (A) and (B) is a sufficient condition for estimating that the second condition is satisfied.

<Condition (A)>

The motor speed Nm is less than a first threshold value Th1 (Nm<Th1).

<Condition (B)>

The motor speed Nm is equal to or greater than the first threshold value Th1 and less than a second threshold value Th2 while the battery voltage Vb is greater than a third threshold value Th3 (Th1≤Nm<Th2 and Th3<Vb).

Condition (A) regulates the motor speed Nm at which the shutdown control is performed. As described above, regenerative torque is generated when the induced voltage generated in the motor 2 is higher than the battery voltage Vb. The induced voltage generated in the motor 2 becomes higher with the motor speed Nm. Because of these, the higher current motor speed Nm is, the higher the possibility becomes for the motor 2 to generate the induced voltage higher than the battery voltage Vb upon a shutdown of the inverter 3. In view of this, the present embodiment employs the condition where the current motor speed Nm is duly low (Nm<Th1) as a sufficient condition for estimating the satisfaction of the second condition.

The satisfaction of condition (A) represents that the current motor speed Nm is low such that the motor 2 is expected to generate an induced voltage not higher than the battery voltage Vb upon a shutdown of the inverter 3. That is, the first threshold value Th1 is a predetermined value corresponding to the motor speed Nm at which the motor 2 is expected to generate an induced voltage equal to or lower than the battery voltage Vb.

On the other hand, condition (B) regulates the motor speed Nm at which the shutdown control is performed in relation to the battery voltage Vb. As described above, regenerative torque is generated when the induced voltage generated in the motor 2 is higher than the battery voltage Vb. Because of this, even if the current motor speed Nm is comparatively high, as far as the current battery voltage Vb is sufficiently high, the motor 2 is less likely to produce regenerative torque upon a shutdown of the inverter 3. In view of this, the present embodiment employs the condition where the current motor speed Nm is relatively high (Th1≤Nm<Th2) and concurrently, the battery voltage Vb is duly high (Th3<Vb), as another sufficient condition for estimating the satisfaction of the second condition.

The satisfaction of condition (B) represents that the current motor speed Nm is somewhat low (Th1≤Nm<Th2) and the current battery voltage Vb is duly high (Th3<Vb) so that the motor 2 is expected to generate an induced voltage not higher than the battery voltage Vb upon a shutdown of the inverter 3. In other words, condition (B) is not satisfied if the motor speed Nm is significantly high (Th2≤Nm) or if the motor speed Nm is somewhat low and the battery voltage Vb is also low (Vb≤Th3).

The second threshold value Th2 is a predetermined value greater than the first threshold value Th1 (Th1<Th2) and is set, for example, at a lowest value of the motor speed Nm at which the motor 2 is expected to generate an induced voltage higher than the battery voltage Vb, irrespective of the value of the battery voltage Vb (in other words, whatever value the battery voltage Vb may be). The third threshold value Th3 is a predetermined value set to be greater than the induced voltage to be generated in the motor 2 if the inverter 3 is shut down while the motor 2 rotates at the speed Nm equal to or higher than the first threshold value Th1 and less than the second threshold value Th2. The third threshold value Th3 of the present embodiment is set to increase with the motor speed Nm.

Figure 2:
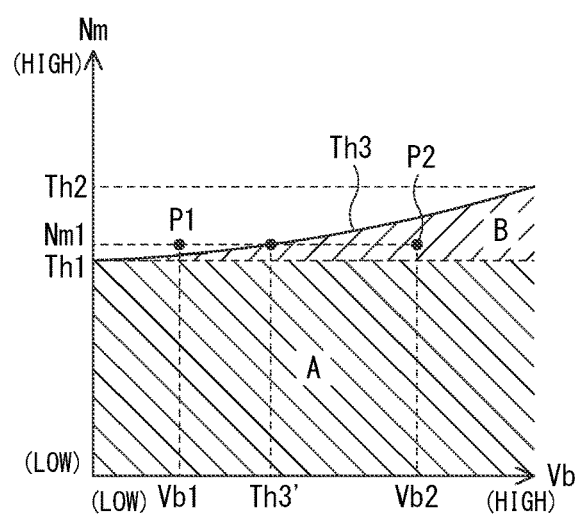
FIG. 2 is an exemplified map memorized in the controlling apparatus of FIG. 1.

For example, the third threshold value Th3 is set as described below. The map illustrated in FIG. 2 describes the motor speed Nm along the vertical axis, the battery voltage Vb along the horizontal axis, and the third threshold value Th3 with the solid line. As illustrated in FIG. 2, if the current motor speed Nm is Nm1 (Th1≤Nm1<Th2), the third threshold value Th3 at the moment is set at the value Th3' which is the horizontal value of a point on the solid line in the map where the vertical value corresponds to the current motor speed Nm1. Accordingly, the third threshold value Th3 of the present embodiment is a variable set in response to the current motor speed Nm.

The map of FIG. 2 represents conditions (A) and (B) as hatched areas (A) and (B), respectively. If the point corresponding to the motor speed Nm and the battery voltage Vb in the map is within area (A), condition (A) is satisfied. Similarly, if the point is within area (B), condition (B) is satisfied.

The estimator 7 plots the point corresponding to the current motor speed Nm and the current battery voltage Vb in the map of FIG. 2 based on the information on the motor speed Nm transmitted from the inverter 3 to the first obtainer 9 and on the battery voltage Vb transmitted from the battery voltage sensor 17 to the second obtainer 10. Then, if the point is within area (A) or (B) in the map, the estimator 7 decides that the second condition is satisfied. Otherwise (if the point is out of both areas (A) and (B) in the map), the estimator 7 decides that the second condition is unsatisfied.

For example, if the current motor speed Nm is Nm1 and the current battery voltage Vb is Vb1 which is a relatively low value, the estimator 7 plots a point P1 in the map of FIG. 2. In this case, since the point P1 is out of both areas (A) and (B) in the map, the estimator 7 decides that the second condition is unsatisfied. Specifically, the third threshold value Th3 in this case is set at the given value Th3' in relation to the current motor speed Nm1 as described above, and since this third threshold value Th3' is greater than the current battery voltage Vb1 (Vb1<Th3'), condition (B) is not satisfied.

In contrast, if the current motor speed Nm is Nm1 (Th1≤Nm1<Th2) and the current battery voltage Vb is Vb2 which is a relatively high value, the estimator 7 plots a point P2 in the map of FIG. 2. In this case, since the point P2 is within area (B) in the map, the estimator 7 decides that the second condition is satisfied. Specifically, since the current battery voltage Vb2 is higher than the third threshold value Th3' (Th3'<Vb2) in this case, condition (B) is satisfied.

The controller 8 controls the connection and shutdown (the connection state of the electrical circuit) of the inverter 3 on the basis of the results of the judgement by the determiner 6 and the estimate by the estimator 7. The controller 8 shuts down the inverter 3 if the determiner 6 judges that the first condition is satisfied and the estimator 7 estimates that the second condition is satisfied. Otherwise, the controller 8 connects the inverter 3.

Accordingly, if the vehicle 1 is put into the coasting state in the regeneration prohibited mode while it is estimated that the motor 2 is not to generate regenerative torque upon a shutdown of the inverter 3, the controller 8 of the present embodiment disconnects the electrical circuit of the inverter 3. This reduces the amount of the electric power to be consumed by the inverter 3. On the other hand, if the vehicle 1 is put into the coasting state in the regeneration prohibited mode while it is estimated that the motor 2 is to generate regenerative torque upon a shutdown of the inverter 3, the controller 8 keeps the connected state of the electrical circuit of the inverter 3 to continue the control of the inverter 3, thereby preventing the generation of regenerative torque. This prevents the deceleration of the vehicle 1 not intended by the driver.

It is to be noted that the controller 8 of the present embodiment shuts down the inverter 3 also in occasions where the vehicle 1 is not moving and where the shifter is at the P or N position. The judgement on whether the vehicle 1 is moving or not can be made on the basis of, for example, the information transmitted from the velocity sensor 15. The judgement on whether the shifter is at the P or N position or not can be made on the basis of, for example, the information transmitted from the shift position sensor 14. The controller 8 may make these judgements. Alternatively, an element other than the controller 8 (for example, the determiner 6) may make these judgements and transmit the results of the judgements to the controller 8.

3. Flow Chart

Figure 3:
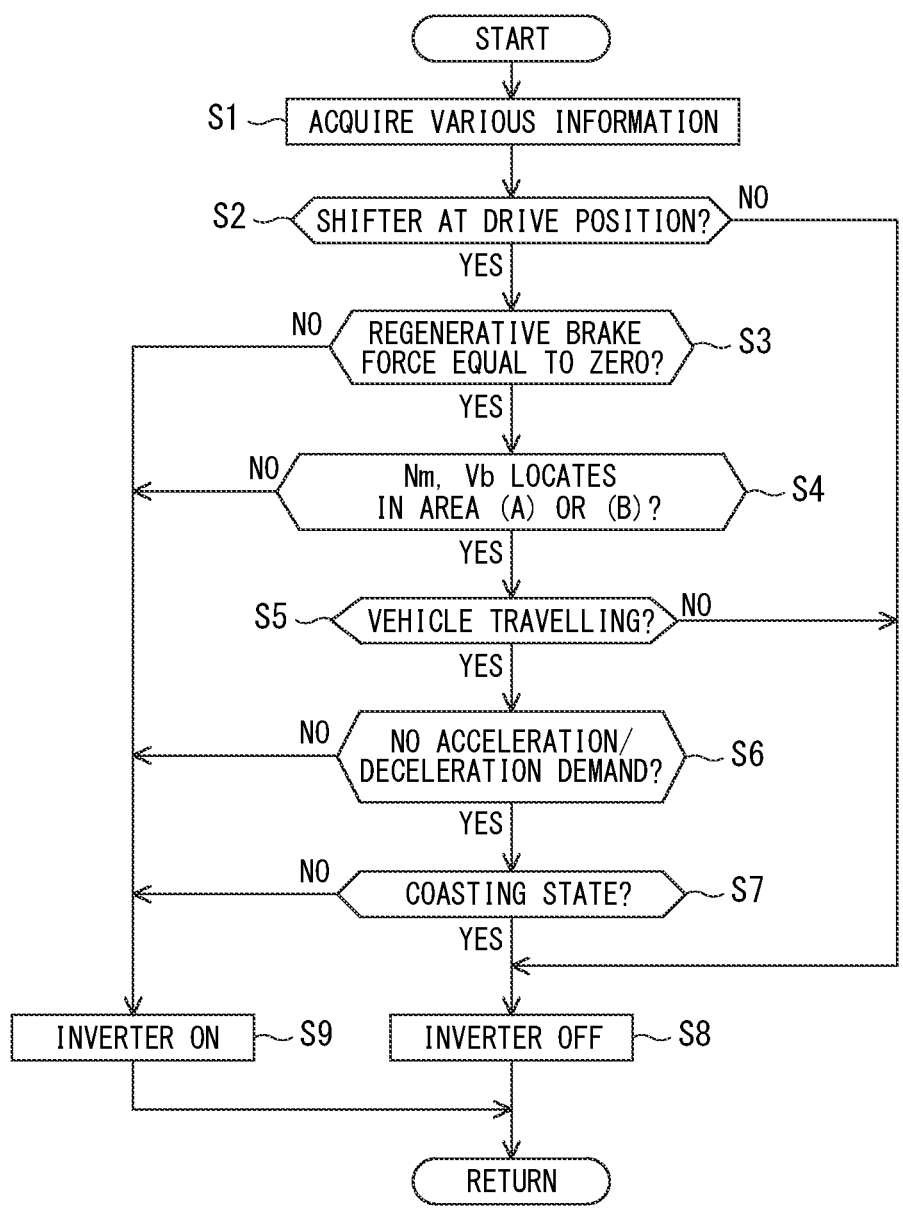
FIG. 3 is a flow chart illustrating the process to be executed by the controlling apparatus of FIG. 1.

FIG. 3 is a flow chart illustrating a process of the above shutdown control. The ECU 5 repeatedly carries out the steps of this flow chart in the predetermined calculation cycle while the main power of the vehicle 1 is on (in the present embodiment, while the vehicle 1 is in the ON state or the READY state).

At step S1, various pieces of information are acquired from the inverter 3, the switches 11-13, and the sensors 14-17. At step S2, the mode determiner 6A judges whether the shifter is at the drive position or not. If the result of the judgement is positive, the flow proceeds to step S3, otherwise (i.e., if the result of the judgement is negative), the flow proceeds to step S8.

At step S3, the mode determiner 6A judges whether the magnitude of the regenerative brake force is set at zero or not. If the result of the judgement is positive, at step S4, the decision is made on whether the plotted point corresponding to the motor speed Nm and the battery voltage Vb is within either one of areas (A) and (B) in the map illustrated in FIG. 2. In other words, at this step, the estimator 7 decides whether one of conditions (A) and (B) is satisfied or not. If the point plotted in the map of FIG. 2 is within area (A) or (B), condition (A) or (B) is satisfied, so that the flow proceeds to step S5. On the other hand, if the result of the judgement at step S3 or S4 is negative (NO route), the flow moves to step S9.

At step S5, the travel determiner 6B judges whether the vehicle 1 is traveling or not and if the result of the judgement is positive, the travel determiner 6B further judges the presence of an acceleration or deceleration demand at step S6. The acceleration or deceleration demand is judged from the operations of the accelerator and the brake. If both the accelerator and the brake are off, the travel determiner 6B makes a judgement of "NO ACCELERATION/DECELERATION DEMAND" and at step S7, further judges whether the vehicle 1 is in the coasting state (that is, whether the torque value of the motor 2 calculated on the basis of, for example, the accelerator position or the pressed amount of the brake equals to zero) or not.

Steps S2 and S3 are the processes for judging whether the mode condition is satisfied or not, and step S4 is the process for estimating whether the second condition is satisfied or not. Steps S5 to S7 are the processes for judging whether the travel condition is satisfied or not.

If the travel condition is determined to be satisfied at step S7, both the first and the second conditions are satisfied; hence, the flow proceeds to step S8 at which the controller 8 controls the inverter 3 such that the inverter 3 is put into the disconnected state and returns. Specifically, at step S8, if the inverter 3 is in the connected state, the controller 8 shuts down the electrical circuit to turn the inverter 3 into the disconnected state, whereas, if the inverter 3 is already in the disconnected state, the controller 8 keeps the disconnected state of the inverter 3.

In contrast, if the result of the judgement at step S6 or S7 is negative (NO route), the first condition is unsatisfied; hence, the flow moves to step S9 at which the controller 8 controls the inverter 3 such that the inverter 3 is put into the connected state and returns. Specifically, at step S9, if the inverter 3 is in the disconnected state, the controller 8 connects the electrical circuit to turn the inverter 3 into the connected state, whereas, if the inverter 3 is already in the connected state, the controller 8 keeps the connected state of the inverter 3.

4. Advantageous Effects (1) The above ECU 5 shuts down the inverter 3 if the ECU 5 estimates that the motor 2 is not to generate regenerative torque upon a shutdown of the inverter 3 while judging that the vehicle 1 is in the coasting state in the regeneration prohibited mode. In other words, the ECU 5 shuts down the inverter 3 while the vehicle 1 is in the coasting state in the regeneration prohibited mode if the driving situation is estimated not to cause the unintended deceleration of the vehicle 1 despite a shutdown of the inverter 3. Accordingly, the amount of the electric power to be consumed by the inverter 3 can be suppressed and thus, the electrical power efficiency of the vehicle 1 can be enhanced. In contrast, since the ECU 5 maintains the connection state of the inverter 3 if the situation is estimated to cause the unintended deceleration due to a shutdown of the inverter 3, it is possible to prevent the deceleration not intended by the driver and thus, the drivability of the vehicle 1 can be ensured. Therefore, the ECU 5 can achieve both enhanced electrical power efficiency and ensured drivability of the vehicle 1.

(2) The above estimator 7 estimates that the motor 2 is not to generate regenerative torque upon a shutdown of the inverter 3 if the motor speed Nm is less than the first threshold value Th1. Since the motor 2 becomes more likely to generate regenerative torque as the motor speed Nm increases, setting a condition that the motor speed Nm is less than the first threshold value Th1 can enhance the accuracy of the estimate by the estimator 7. As a consequence, the connection and the shutdown of the inverter 3 can be properly controlled, so that it is possible to achieve both the enhanced electrical power efficiency and the ensured drivability of the vehicle 1 more sufficiently.

(3) The motor speed Nm is relatively easy to obtain and is often used in other control such as a driving control of the motor 2 as well as in the above shutdown control. Hence, using the motor speed Nm in the estimate by the estimator 7 can readily increase the accuracy of the estimate with simple logic. As a result, it is possible to achieve both the enhanced electrical power efficiency and the ensured drivability of the vehicle 1 more sufficiently while suppressing the control load and the cost.

(4) Even if the motor speed Nm is equal to or greater than the first threshold value Th1, as far as the motor speed Nm is less than the second threshold value Th2 and the battery voltage Vb is greater than the third threshold value Th3, the above estimator 7 estimates that the motor 2 is not to generate regenerative torque upon a shutdown of the inverter 3. Accordingly, by referring to the battery voltage Vb as well as the motor speed Nm, it is possible to increase opportunity for estimating that the motor 2 is not to generate regenerative torque upon a shutdown of the inverter 3. Therefore, the electrical power efficiency can be further enhanced while the drivability is ensured.

(5) The above third threshold value Th3 is set to increase with the motor speed Nm. Since the motor 2 becomes more likely to generate regenerative torque as the motor speed Nm increases, changing the third threshold value Th3 in conformity with the motor speed Nm can further enhance the accuracy of the estimate by the estimator 7. As a consequence, the connection and the shutdown of the inverter 3 can be controlled more properly, so that it is possible to achieve both the enhanced electrical power efficiency and the ensured drivability of the vehicle 1 more sufficiently.

5. Others

The above embodiment may be modified in various manners within the purpose of the invention. The elements of the present embodiment can be combined in any form as appropriate and some of the elements may be omitted.

The above embodiment assumes a configuration that the estimator 7 estimates whether the second condition is satisfied or not based on the motor speed Nm and the battery voltage Vb, but the estimator 7 may estimate the satisfaction and dissatisfaction of the second condition based solely on the motor speed Nm. In other words, condition (B) described above may be omitted. In this case, the estimate by the estimator 7 can be simplified, so that the control load and the cost can be suppressed.

Alternatively, the estimator 7 may estimate the satisfaction and dissatisfaction of the second condition on the basis of, instead of the motor speed Nm, a parameter (first parameter) positively correlating with the motor speed Nm. An example of the parameter positively correlating with the motor speed Nm is a voltage Vm applied to the motor 2 (hereinafter, this voltage Vm is referred to as motor voltage Vm). The motor voltage Vm can be acquired, for example, from inverter 3 with known methods.

In a similar manner, the estimator 7 may estimate the satisfaction and dissatisfaction of the second condition on the basis of, instead of the battery voltage Vb, a parameter (second parameter) positively correlating with the battery voltage Vb. An example of the parameter positively correlating with the battery voltage Vb is a state of charge (SOC, charging rate) of the battery 4. The SOC of the battery 4 can be calculated or acquired with known methods.

Further, the estimator 7 may estimate the satisfaction of the second condition if condition (C) described below, instead of conditions (A) and (B) described above, is satisfied. In other words, the estimator 7 may estimate the satisfaction of the second condition if one of three conditions (A) to (C) is satisfied and may estimate the dissatisfaction of the second condition if none of conditions (A) to (C) is satisfied.

<Condition (C)>

The motor voltage Vm is lower than the battery voltage Vb (Vm<Vb).

Condition (C) regulates the magnitude relationship between the motor voltage Vm and the battery voltage Vb at immediately before a shutdown of the inverter 3. As described above, regenerative torque is generated when the induced voltage generated in the motor 2 is higher than the battery voltage Vb. Because of this, even when the vehicle 1 is in the coasting state in the regeneration prohibited mode, the inverter 3 is controlled under the state of being connected and thereby, the motor 2 is controlled so as to make the regenerative torque zero or substantially zero. The motor voltage Vm applied to the motor 2 by this controlled inverter 3 nearly equals the induced voltage to be generated in the motor 2 upon a shutdown of the inverter 3. In view of this, the estimator 7 may employ the condition where the motor voltage Vm at immediately before a shutdown of the inverter 3 is lower than the battery voltage Vb, as a sufficient condition for estimating the satisfaction of the second condition.

In this case as well, the accuracy of the estimate by the estimator 7 can be increased, so that it is possible to achieve both the enhanced electrical power efficiency and the ensured drivability of the vehicle 1 more sufficiently.

Although regenerative torque is theoretically not to be generated upon a shutdown of the inverter 3 if condition (C) is satisfied, the estimator 7 may employ condition (D) described below as an alternative to condition (C) to ensure the prevention of the generation of regenerative torque.

<Condition (D)>

The motor voltage Vm is lower than the battery voltage Vb by at least a predetermined value X (X≤Vb−Vm).

The satisfaction of condition (D) represents that the difference between the motor voltage Vm and the battery voltage Vb is equal to or greater than the predetermined value X. The predetermined value X is set as a positive value. The larger the predetermined value X is set, the harder it becomes for the second condition to be satisfied unless the difference between the motor voltage Vm and the batter voltage Vb is large, so that, the prevention of the generation of regenerative torque can be highly ensured. As such, setting a sufficient condition where the motor voltage Vm is sufficiently lower than the battery voltage Vb for estimating the satisfaction of the second condition can highly ensure that the regenerative torque is prevented from being produced in the motor 2 when the inverter 3 is shut down. Thus, the drivability of the vehicle 1 can be ensured more properly.

The threshold values Th1, Th2 and Th3 illustrated in the map of FIG. 2 in the above embodiment are merely examples. The above embodiment assumes that the third threshold value Th3 is set to increase with the motor speed Nm, but alternatively, the third threshold value Th3 may be set as a constant value or to increase stepwise (in steps) as the motor speed Nm increases. Although each of the threshold values Th1, Th2, and Th3 should not be limited to that designed in the map as described above, by using the map as described above, the satisfaction and the dissatisfaction of the second condition can be determined in a simpler control configuration, so that the control load and the cost can be suppressed. Preferably, the map is prepared based on the characteristic of the motor 2 (for example, the relationship between the motor speed Nm and the induced voltage generated in the motor 2) in advance, and is stored such that the estimator 7 can refer.

Although the above embodiment assumes a configuration that the magnitude of the regenerative brake force is settable to multiple levels, other configurations are also applicable as far as the vehicle 1 can set the magnitude of the regenerative brake force at zero. In other words, any vehicle is applicable if the regeneration prohibited mode is settable therein. The vehicle may be equipped with, as an alternative to the above paddle switch 12, for example, a switch that can change modes between the regeneration prohibited mode and a drive mode in which the electric power is to be regenerated (the regenerative brake is applicable) during the coast with the accelerator being off.

REFERENCE SIGNS LIST 1 vehicle
1 motor
3 inverter
4 battery
5 ECU (controlling apparatus)
6 determiner
7 estimator
8 controller
9 first obtainer
10 second obtainer
Nm, Nm1 motor speed (first parameter)
Th1 first threshold value
Th2 second threshold value
Th3, Th3' third threshold value
SOC state of charge, charging rate (second parameter)
Vb, Vb1, Vb2 battery voltage (second parameter)
Vm motor voltage (first parameter)

The invention thus described, it will be obvious that the same may be varied in many ways. Such variations are not to be regarded as a departure from the gist of the invention and all such modifications as would be obvious to one skilled in the art are intended to be included within the scope of the following claims.

What is claimed is:

1. A controlling apparatus for a vehicle including a motor for traveling, an inverter for driving the motor, and a battery being connected to the motor via the inverter and being rechargeable and dischargeable, the controlling apparatus comprising:
a determiner that judges whether a first condition is satisfied or not, the first condition being satisfied if the vehicle is in a coasting state in a regeneration prohibited mode in which a regenerative brake is disabled;
an estimator that estimates whether a second condition is satisfied or not, the second condition being satisfied if the motor is not to generate a regenerative torque upon a shutdown of the inverter; and
a controller that shuts down the inverter if the determiner judges that the first condition is satisfied and the estimator estimates that the second condition is satisfied.

2. The controlling apparatus according to claim 1, further comprising a first obtainer that acquires a first parameter correlating with a number of revolutions of the motor, wherein
the estimator estimates that the second condition is satisfied when the first parameter acquired by the first obtainer is less than a predetermined first threshold value.

3. The controlling apparatus according to claim 2, further comprising a second obtainer that acquires a second parameter correlating with a voltage of the battery, wherein the estimator estimates that the second condition is satisfied when the first parameter acquired by the first obtainer is equal to or greater than the first threshold value and less than a predetermined second threshold value being greater than the first threshold value while the second parameter acquired by the second obtainer is greater than a predetermined third threshold value.

4. The controlling apparatus according to claim 3, wherein the third threshold is set to increase with the first parameter.

5. The controlling apparatus according to claim 3, wherein the estimator estimates whether the second condition is satisfied or not by referring to a map representing a relationship between the first parameter and the second parameter.

6. The controlling apparatus according to claim 4, wherein the estimator estimates whether the second condition is satisfied or not by referring to a map representing a relationship between the first parameter and the second parameter.

7. The controlling apparatus according claim 2, wherein the first parameter is the number of revolutions of the motor.

8. The controlling apparatus according claim 3, wherein the first parameter is the number of revolutions of the motor.

9. The controlling apparatus according claim 4, wherein the first parameter is the number of revolutions of the motor.

10. The controlling apparatus according claim 5, wherein the first parameter is the number of revolutions of the motor.

11. The controlling apparatus according claim 6, wherein the first parameter is the number of revolutions of the motor.

12. The controlling apparatus according claim 1, wherein the estimator estimates that the second condition is satisfied when a voltage applied to the motor is lower than a voltage of the battery.

13. The controlling apparatus according claim 2, wherein the estimator estimates that the second condition is satisfied when a voltage applied to the motor is lower than a voltage of the battery.

14. The controlling apparatus according claim 3, wherein the estimator estimates that the second condition is satisfied when a voltage applied to the motor is lower than a voltage of the battery.

15. The controlling apparatus according claim 4, wherein the estimator estimates that the second condition is satisfied when a voltage applied to the motor is lower than a voltage of the battery.

16. The controlling apparatus according claim 5, wherein the estimator estimates that the second condition is satisfied when a voltage applied to the motor is lower than a voltage of the battery.

17. The controlling apparatus according claim 6, wherein the estimator estimates that the second condition is satisfied when a voltage applied to the motor is lower than a voltage of the battery.

18. The controlling apparatus according claim 7, wherein the estimator estimates that the second condition is satisfied when a voltage applied to the motor is lower than a voltage of the battery.

* * * * *